US012464306B2

(12) United States Patent
Lee et al.

(10) Patent No.: US 12,464,306 B2
(45) Date of Patent: Nov. 4, 2025

(54) METHOD AND APPARATUS FOR PROCESSING ACOUSTIC SPATIAL INFORMATION

(71) Applicant: Electronics and Telecommunications Research Institute, Daejeon (KR)

(72) Inventors: Yong Ju Lee, Daejeon (KR); Jae-hyoun Yoo, Daejeon (KR); Dae Young Jang, Daejeon (KR); Kyeongok Kang, Daejeon (KR); Tae Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 378 days.

(21) Appl. No.: 18/091,966

(22) Filed: Dec. 30, 2022

(65) Prior Publication Data

US 2023/0224665 A1 Jul. 13, 2023

(30) Foreign Application Priority Data

Jan. 13, 2022 (KR) ........................ 10-2022-0005415
Dec. 12, 2022 (KR) ........................ 10-2022-0172631

(51) Int. Cl.
*H04S 7/00* (2006.01)

(52) U.S. Cl.
CPC .............. *H04S 7/303* (2013.01); *H04S 7/305* (2013.01); *H04S 2400/11* (2013.01)

(58) Field of Classification Search
CPC ...... H04S 2400/11; H04S 7/305; H04S 7/307; H04S 7/303; H04S 7/30; H04S 2420/01; H04S 2420/11
See application file for complete search history.

(56) References Cited

U.S. PATENT DOCUMENTS

| | | | |
|---|---|---|---|
| 8,386,215 B2 | 2/2013 | Kim et al. | |
| 9,940,922 B1 | 4/2018 | Schissler et al. | |
| 10,984,350 B2 | 4/2021 | KnicKrehm et al. | |
| 2014/0091963 A1 | 4/2014 | Jung et al. | |
| 2016/0109284 A1 | 4/2016 | Hammershøi et al. | |
| 2017/0208417 A1* | 7/2017 | Thakur | H04S 7/306 |
| 2020/0293273 A1 | 9/2020 | Dantrey et al. | |

FOREIGN PATENT DOCUMENTS

| | | |
|---|---|---|
| EP | 3209037 A1 * | 8/2017 |
| JP | 5168373 B2 | 3/2013 |

OTHER PUBLICATIONS

Indoor Acoustic Simulator: A Modeling and Simulation Framework with Doppler Effect for Broadband Ultrasonic Applications, Feb. 2017, Publisher: LAPISBN: 978-3-330-04228-5.

(Continued)

*Primary Examiner* — Kile O Blair
(74) *Attorney, Agent, or Firm* — WILLIAM PARK AND ASSOCIATES LTD.

(57) ABSTRACT

A method and apparatus for processing acoustic spatial information are provided. The method of processing acoustic spatial information includes identifying at least one mesh disposed in an acoustic space, setting a minimum cuboid surrounding the mesh as a bounding box, and generating acoustic spatial information including information about the bounding box.

10 Claims, 8 Drawing Sheets

(56) References Cited

OTHER PUBLICATIONS

MPEG-I Audio Architecture and Requirements, International Organisation for Standardisation Organisation Internationale De Normalisation ISO/IEC JTC1/SC29/WG11 Coding of Moving Pictures and Audio, ISO/IEC JTC1/SC29/WG11 MPEG2019/N18158, Jan. 2019, Marrakech, Morocco.

Prasanga N. Samarasinghe et al., Spherical Harmonics Based Generalized Image Source Method for Simulating Room Acoustics, Audio and Acoustic Signal Processing Group, Research School of Engineering, Australian National University, Canberra, Australia, J. Acoust. Soc. Am. 144 (3), Sep. 2018.

Resonance Audio of Google, https://resonance-audio.github.io/resonance-audio/.

Samuel Siltanen, Geometry Reduction in Room Acoustics Modeling, Proceedings of the Institute of Acoustics, vol. 28. Pt.2., Helsinki University of Technology, Department of Computer Science, Telecommunications Software and Multimedia Laboratory, Sep. 30, 2005.

What is Project Acoustics?, Project Acoustics Overview—Microsoft Game Dev, Microsoft Docs, May 24, 2022, https://docs.microsoft.com/en-us/gaming/acoustics/what-is-acoustics.

* cited by examiner x_min is smallest value among x-coordinates of all vertices
x_max is largest value among x-coordinates of all vertices
y_min is smallest value among y-coordinates of all vertices
y_max is largest value among y-coordinates of all vertices
z_min is smallest value among z-coordinates of all vertices
z_max is the largest value among z-coordinates of all vertices vertex_01 = (x_min, y_min, z_min)
vertex_02 = (x_max, y_min, z_min)
vertex_03 = (x_min, y_max, z_min)
vertex_04 = (x_max, y_max, z_min)
vertex_05 = (x_min, y_min, z_max)
vertex_06 = (x_max, y_min, z_max)
vertex_07 = (x_min, y_max, z_max)
vertex_08 = (x_max, y_max, z_max)

FIG. 3

```
//on left side
Face_01 = vertices (vertex_03, vertex_05, vertex_01)
Face_02 = vertices (vertex_03, vertex_05, vertex_07)
//on front side
Face_03 = vertices (vertex_05, vertex_08, vertex_07)
Face_04 = vertices (vertex_05, vertex_08, vertex_06)
//on right side
Face_05 = vertices (vertex_04, vertex_06, vertex_08)
Face_06 = vertices (vertex_04, vertex_06, vertex_02)
//on rear side
Face_07 = vertices (vertex_01, vertex_04, vertex_03)
Face_08 = vertices (vertex_01, vertex_04, vertex_02)
//on front side
Face_09 = vertices (vertex_03, vertex_08, vertex_07)
Face_10 = vertices (vertex_03, vertex_08, vertex_04)
//on bottom side
Face_11 = vertices (vertex_01, vertex_06, vertex_02)
Face_12 = vertices (vertex_01, vertex_06, vertex_05)
```

FIG. 5

METHOD AND APPARATUS FOR PROCESSING ACOUSTIC SPATIAL INFORMATION

CROSS-REFERENCE TO RELATED APPLICATION

This application claims the benefit of Korean Patent Application No. 10-2022-0005415 filed on Jan. 13, 2022, and Korean Patent Application No. 10-2022-0172631 filed on Dec. 12, 2022, in the Korean Intellectual Property Office, the entire disclosure of which are incorporated herein by reference for all purposes.

BACKGROUND

1. Field of the Invention

One or more embodiments relate to a method and apparatus for processing acoustic spatial information.

2. Description of the Related Art

In general, acoustic spatial information may be expressed in various ways. For example, acoustic spatial information may be expressed in the form of a mesh having a plurality of triangles, Various objects and structures located in a space may be expressed through such a mesh.

In order to generate an impulse response of object audio from the acoustic spatial information, the acoustic spatial information needs to be expressed in a different way.

SUMMARY

Embodiments provide a method and apparatus fir providing a scheme of representing acoustic spatial information to generate an impulse response in an acoustic space.

According to an aspect, there is provided a method of processing acoustic spatial information, including identifying at least one mesh disposed in an acoustic space, setting a minimum cuboid surrounding the mesh as a bounding box, and generating acoustic spatial information including information about the bounding box.

The setting of the bounding box may include setting the bounding box based on x_min that is a minimum value of an x-axis with respect to the bounding box, y_min that is a minimum value of a y-axis with respect to the bounding box, z_min that is a minimum value of a z-axis with respect to the bounding box, x_max that is a maximum value of the x-axis with respect to the bounding box, y-max that is a maximum value of the y-axis with respect to the bounding box, and z_max that is a maximum value of the z-axis with respect to the bounding box.

The setting of the bounding box may include determining eight vertices of the bounding box and determining a plurality of triangles, using the eight vertices.

The eight vertices may be defined as vertex_01=(x_min, y_min, z_min), vertex_02=(x_max, y_min, z_min), vertex_03=(x_min, y_max, z_min); vertex_04=(x_max, y_max, z_min); vertex_05=(x_min, y_min, z_max); vertex_06=(x_max, y_min, z_max); vertex_07=(x_min, y_max, z_max); and vertex_08=(x_max, y_max, z_max).

The plurality of triangles may be defined as Face_01=vertices (vertex_03, vertex_05, vertex_01), Face_02=vertices (vertex_03, vertex_05, vertex_07); Face_03=vertices (vertex_05, vertex_08, vertex_07); Face_04=vertices (vertex_5, vertex_08, vertex_06); Face_05=vertices (vertex_04, vertex_06, vertex_08); Face_06=vertices (vertex_04, vertex_06, vertex_02); Face_07=vertices (vertex_01, vertex_04, vertex_03); Face_08=vertices (vertex_01, vertex_04, vertex_02); Face_09=vertices (vertex_03, vertex_08, vertex_07); Face_10=vertices (vertex_03, vertex_08, vertex_04); Face_11=vertices (vertex_01, vertex_06, vertex_02); and Face_12=vertices (vertex_01, vertex_06, vertex_05).

According to another aspect, there is provided a method of processing acoustic spatial information, the method including identifying at least one mesh in an acoustic space, identifying a straight line connecting an audio object to a listener in the acoustic space, determining a number of times triangles of a representative cuboid surrounding the at least one mesh pass through the straight line, and generating an impulse response based on the determined number of times.

The determining of the number of times may include, when a mesh exists on the straight line, determining the number of times the triangles of the representative cuboid pass through the straight line, based on a number of triangles constituting the representative cuboid corresponding to the mesh and a number of faces constituting the mesh.

The determining of the number of times may include, when a mesh does not exist on the straight line, determining the number of times the triangles of the representative cuboid pass through the straight line, based on a number of triangles constituting the representative cuboid corresponding to the mesh.

According to another aspect, there is provided an apparatus for processing acoustic spatial information, the apparatus including a processor. The processor may be configured to identify at least one mesh disposed in an acoustic space, set a minimum cuboid surrounding the mesh as a bounding box, and generate acoustic spatial information including information about the bounding box.

The processor may be configured to set the bounding box based on x_min that is a minimum value of an x-axis with respect to the bounding box, y_min that is a minimum value of a y-axis with respect to the bounding box, z_min that is a minimum value of a z-axis with respect to the bounding box, x_max that is a maximum value of the x-axis with respect to the bounding box, y-max that is a maximum value of the y-axis with respect to the bounding box, and z_max that is a maximum value of the z-axis with respect to the bounding box.

The processor may be configured to determine eight vertices of the bounding box and determine a plurality of triangles, using the eight vertices.

The eight vertices may be defined as vertex_01=(x_min, y_min, z_min); vertex_02=(x_max, y_min, z_min); vertex_03=(x_min, y_max, z_min); vertex_04=(x_max, y_max, z_min); vertex_05=(x_min, y_min, z_max); vertex_06=(x_max, y_min, z_max); vertex_07=(x_min, y_min, z_min); and vertex_08=(x_max, y_max, z_max).

The plurality of triangles may be defined as: Face_01=vertices (vertex_03, vertex_05, vertex_01); Face_02=vertices (vertex_03, vertex_05, vertex_07); Face_03=vertices (vertex_05, vertex_08, vertex_07) Face_04=vertices (vertex_05, vertex_08, vertex_06); Face_05=vertices (vertex_04, vertex_06, vertex_08); Face_06=vertices (vertex_04, vertex_06, vertex_02); Face_07=vertices (vertex_01, vertex_04, vertex_03); Face_08=vertices (vertex_01, vertex_04, vertex_02); Face_09=vertices (vertex_03, vertex_08, vertex_07); Face_10=vertices (vertex_03, vertex_08, vertex_04); Face_11=vertices (vertex_01, vertex_06, vertex_02); and Face_12=vertices (vertex_01, vertex_06, vertex_05).

Additional aspects of embodiments swill be set forth in part in the description which follows and, in part, will be apparent from the description, or may be learned by practice of the disclosure.

According to embodiments, acoustic space information may be expressed in order to generate an impulse response of an acoustic space.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is a diagram illustrating an example of a vertex of a representative cuboid according to an embodiment;

FIG. 5 is a diagram illustrating vertices of "12" triangles representing a surface of a representative cuboid according to an embodiment;

DETAILED DESCRIPTION

Figure 1:
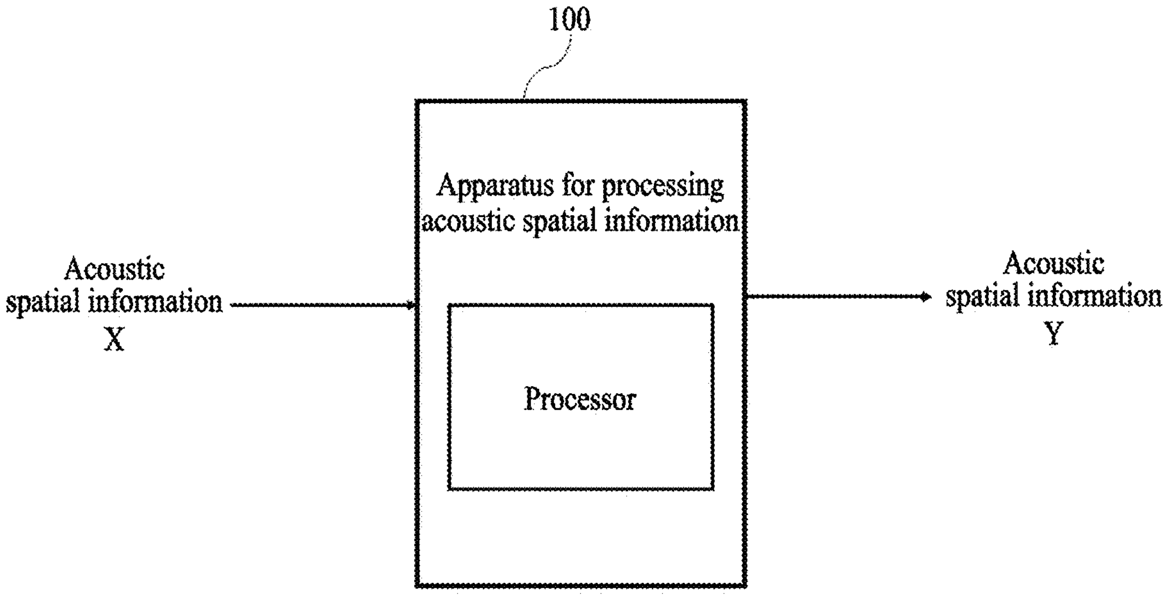
FIG. 1 is a diagram illustrating an apparatus for processing acoustic spatial information according to an embodiment.

Hereinafter, embodiments will be described in detail with reference to the accompanying drawings. The scope of the right, however, should not be construed as limited to the embodiments set forth herein. In the drawings, like reference numerals are used for like elements.

Various modifications may be made to the embodiments. Here, the embodiments are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular embodiments only and is not to be limiting of the embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Hereinafter, embodiments will be described in detail with reference to the accompanying drawings.

FIG. 1 is a diagram illustrating an apparatus for processing acoustic spatial information according to an embodiment.

Referring to FIG. 1, an apparatus for processing acoustic spatial information 100 may generate acoustic spatial information Y by further adding information about a representative cuboid to acoustic spatial information X. The representative cuboid may refer to the smallest cuboid including all the spaces of one mesh. The representative cuboid may be utilized when an impulse response of an acoustic space is generated.

Figure 2:
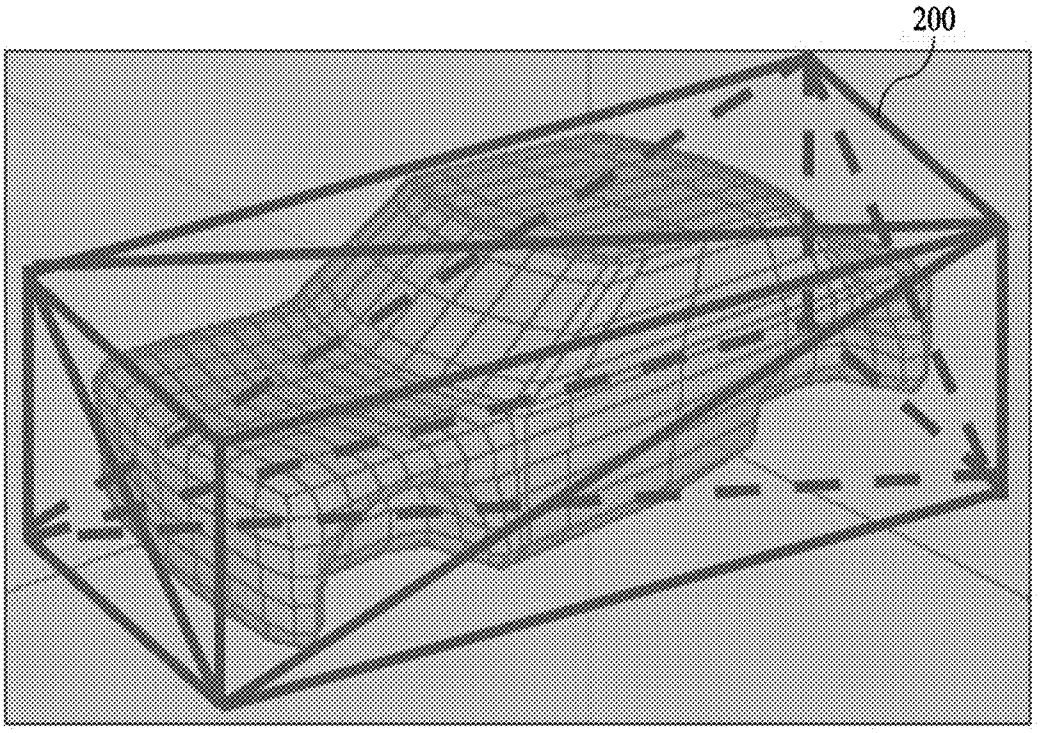
FIG. 2 is a diagram illustrating an example of a representative cuboid according to an embodiment.

According to an embodiment, when spatial geometry information is given, an impulse response may be generated using a ray tracing method. According to the ray tracing method, information about reflection on a face (a triangle or a square) on which sound rays form a space may be determined. For example, as shown in FIG. 2, when a car exists in a space, reflection in a space may be determined after replacing the car with a simplified cuboid having six faces rather than replacing the car with an object in a complex shape. That is, by replacing an object existing in a space with a simple representative cuboid, the amount of calculations generated when determining an impulse response in a space may be reduced.

When an impulse response is generated by using ray tracing based on acoustic spatial information, the impulse response may be calculated by substituting with a representative cuboid to reduce the amount of calculations required to express complicated spatial acoustic information.

According to an embodiment, an early reflection for the following two methods may be determined.

(1) Method 1

According to an embodiment, an early reflection may be determined by calculating a specular reflection from reflection from a surface using geometric data. An image source model may be used to check a potential propagation path from a sound source to a listener in an acoustic space. A check on the potential propagation path includes a process of checking whether rays, which are transmitted from a listener to a position of a potential image source to check the potential propagation path, hit a correct surface. In this case, pre-calculated voxel data may be used to expedite the process. The voxel data may include a list of valid propagation paths for a given cubic sound source and a listener's area for a plurality of rays. By using the voxel data, real-time rendering of a second order may be performed even in the space of a complex geometric environment. In the absence of the voxel data, only a first order may be generated.

To determine an early reflection, sound transmission through an occlusion material or a transmissive material may be considered. In addition, modelling for sound propagation may be possible using a transmission filter.

In the present disclosure, the voxel data refers to a combination of a volume and a pixel in a three-dimensional (3D) space. The voxel data may include at least one of a voxel for a sound source in a space, a voxel for a listener, and a voxel for an object that may be recognized by a plurality of rays reaching from a sound source to a listener in a space as an obstacle in the space. As described above, rendering may be performed based on voxels for a sound source, a listener, and an object existing in a space for fast processing. In this case, after the sound source, the listener, and the object are all replaced with an object, such as a bounding box in a specific shape, for example, the cuboid described herein, reflection information in a space may be determined using voxel data of the object. Alternatively, rendering of the sound source in a space may be performed using the vertex data about a bounding box applied to a sound source, a listener, and an object; and surface data or triangle data constituting the bounding box.

(2) Method 2

A predefined early reflection pattern of low complexity may be used to calculate an early reflection. The pattern of the early reflection fills a room between a direct sound and a late reverberation with time and space. In the case of method 2, the early reflection may be determined based on at least one of a room acoustic parameter (e.g., a pre-delay time to a late reverberation), a distance from a sound source to a listener, and a position of a listener.

The early reflection may move in a fixed pattern depending on a listener's position. In addition, the early reflection does not rely on room geometric description and a relative position between a sound source and a listener in relation to a room boundary. The pattern of the early reflection may move horizontally with respect to a listener's position. Geometry analysis on a mesh of a listener's position may be performed at an encoder.

FIG. 2 is a diagram illustrating a representative cuboid according to an embodiment.

The smallest cuboid including all surfaces surrounding an automobile illustrated in FIG. 2 may be defined as a representative cuboid. In the representative cuboid, each face may have a triangle, and the triangle may have three vertices.

According to an embodiment, when an object, such as a car, exists in an acoustic space, an apparatus for processing acoustic spatial information 100 may convert an object corresponding to a mesh into a representative cuboid to express acoustic spatial information.

FIG. 3 is a diagram illustrating an example of vertices of a representative cuboid according to an embodiment.

FIG. 3 illustrates an example of a bounding box surrounding a mesh. For example, the bounding box may be set to be a minimum cuboid surrounding the mesh. The bounding box may be determined based on the mesh. The bounding box may be set by using a minimum x coordinate value (e.g., x_min), a maximum x coordinate value (e.g., x_max), a minimum y coordinate value (e.g., y_min), a maximum y coordinate value (e.g., y-max), a minimum z coordinate value (e.g., z_min), and a maximum z coordinate value (e.g., z_max) among dots included in the mesh in 3D spatial coordinates (e.g., an x-axis, a y-axis, and a z-axis).

x_min may be a minimum value of the x-axis of the bounding box, y_min may be a minimum value of the y-axis of the bounding box, z_min max be a minimum value of the z-axis of the bounding box, x_max may be a maximum value of the x-axis of the bounding box, y_max may be a maximum value of the y-axis of the bounding box, and z_max may be a maximum value of the z-axis of the bounding box.

The bounding box may include a space that the mesh has. The bounding box may indicate constraints of all vertices included in the mesh. For example, all the vertices included in the mesh may be included in the bounding box. x-axis, y-axis, and z-axis values of 3D coordinates of all the vertices included in the mesh may be included in a range of the minimum value or more of the x-axis, y-axis, and z-axis of the bounding box and the maximum value or less of the x-axis, y-axis, and z-axis of the bounding box. x, y, and z coordinates of all the vertices included in the mesh may be included in a range of x_min or more and x-max or less, a range of y_min or more and y-max or less, and a range of z_min or more and z-max or less, respectively.

In an example, the bounding box may be referred to as a representative cuboid. The description of the representative cuboid may be substantially equally applied to the bounding box, and the description of the hounding box may be substantially equally applied to the representative cuboid. Therefore, in the following description, the description of the representative cuboid provided with reference to FIGS. 1 and 2 may be substantially equally applied to the hounding box, and the description of the hounding box may be substantially equally applied to the representative cuboid.

FIG. 3 shows an example of eight vertices of a representative cuboid covering all the space of one mesh. x_min represents the smallest value among x-coordinates of all vertices of the representative cuboid. x_max represents the largest value among x-coordinates of all vertices of the representative cuboid. y_min represents the smallest value among y-coordinates of all vertices of the representative cuboid. y_max represents the largest value among y-coordinates of all vertices of the representative cuboid. z_min represents the smallest value among z-coordinates of all vertices of the representative cuboid. z_max represents the largest value among z-coordinates of all vertices of the representative cuboid.

Then, the eight vertices constituting the representative cuboid may be expressed as vertex_01 to vertex_08 shown in FIG. 3. Eight vertices of the representative cuboid may be determined based on x_min, y_min, z_min, x_max, y_max, and z_max for determining the bounding box.

In an example, the hounding box may be used for decoding a geometry of an acoustic space. For example, the decoding of the geometry may be performed using six processing units.

A first unit may decode header information, such as vertexCount and vertexQuantStep that may select an encoder.

A second unit may decode a bounding box for the geometry. The bounding box may refer to spatial constraints of all vertices. All the vertices may not exceed the size of the bounding box. Since a vertex (or vertices) may be quantized into a uniformly spaced grid, the vertex may belong to a uniform spatial grid with its boundaries defined in the bounding box. For example, variables, such as x_min, y_min, z_min, x_max, y_max, and z_max, may be used to indicate the bounding box.

A third unit may decode a step size between all vertices for each dimension. A fourth unit may decode vertices of each dimension.

A fifth unit may reconstruct vertices according to data retrieved from a previous unit. A sixth unit may decode a face list.

Figure 4:
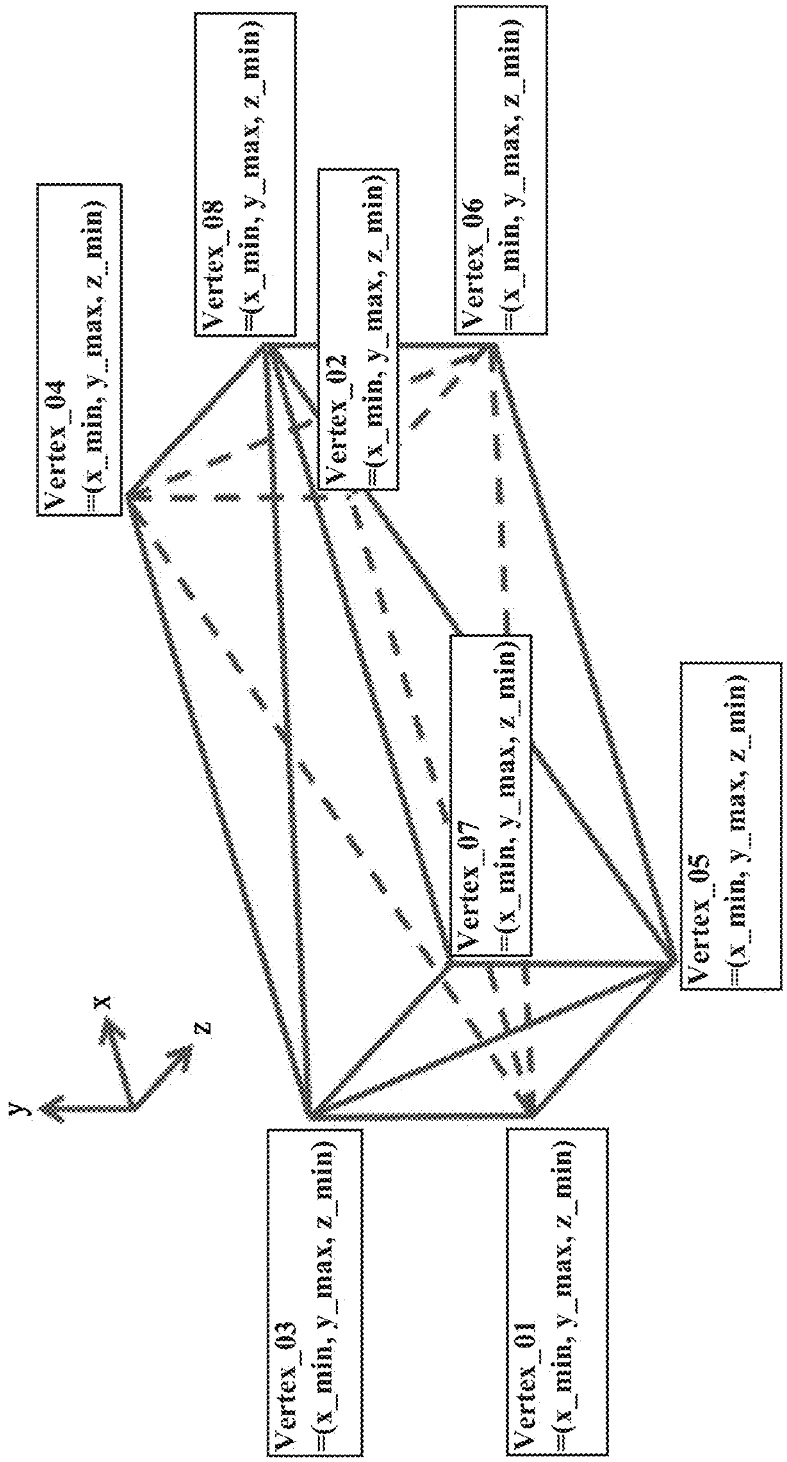
FIG. 4 is a diagram illustrating an example in which vertices of a representative cuboid are expressed in a three-dimensional (3D) space according to an embodiment.

FIG. 4 is a diagram illustrating an example in which vertices of a representative cuboid are expressed in a three-dimensional space according to an embodiment.

The eight vertices of the representative cuboid of FIG. 4 correspond to the vertices described with reference to FIG. 3. In this way, the eight vertices may be used to represent "12" triangles on faces of the representative cuboid.

FIG. 5 is a diagram illustrating vertices of "12" triangles representing faces of a representative cuboid according to an embodiment.

FIG. 5 shows that "12" triangles on the faces of the representative cuboid are expressed as vertices described with reference to FIG. 3. The "12" triangles on the faces of the representative cuboid may be represented by eight vertices.

Figure 6:
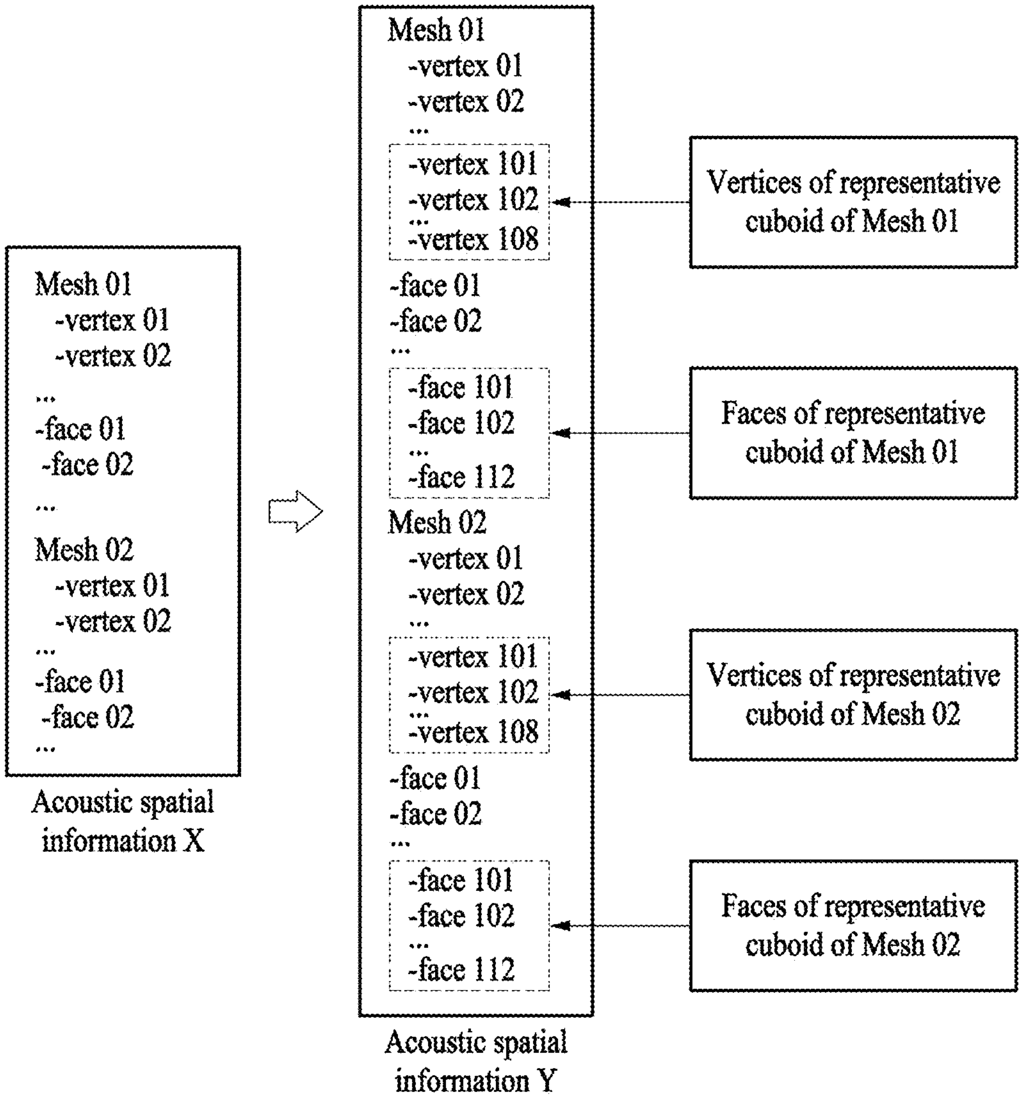
FIG. 6 is a diagram illustrating a result of reflecting vertices and triangles of a representative cuboid in acoustic spatial information according to an embodiment.

FIG. 6 is a diagram illustrating a result of reflecting vertices and triangles of a representative cuboid in acoustic spatial information according to an embodiment.

Referring to FIG. 6, acoustic spatial information Y may be generated by further adding, to acoustic spatial information X, information including a representative cuboid corresponding to a mesh disposed in an acoustic space.

Referring to FIG. 6, two meshes (Mesh 01 and Mesh 02) may be disposed in an acoustic space. Then, eight vertices and "12" triangles constituting the representative cuboid surrounding the mesh may be expressed in acoustic spatial information Y. In FIG. 6, vertices 101 to 108 in Mesh 01 represent eight vertices of the representative cuboid surrounding Mesh 01 disposed in an acoustic space and faces 101 to 112 represent "12" triangles of the representative cuboid surrounding Mesh 01 disposed in the acoustic space.

Similarly, in FIG. 6, vertices 101 to 108 in Mesh 02 indicate eight vertices of the representative cuboid surrounding Mesh 02 disposed in the acoustic space and faces 101 to 112 represent "12" triangles of the representative cuboid surrounding Mesh 02 disposed in the acoustic space.

Figure 7:
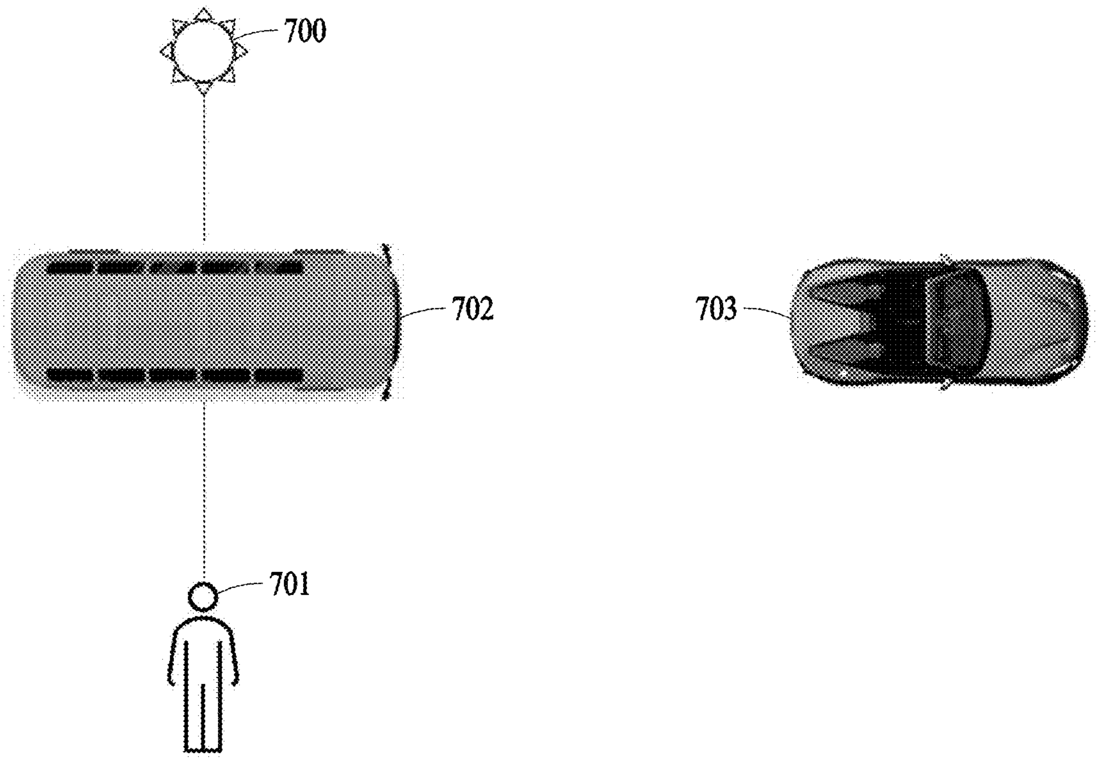
FIG. 7 is a diagram illustrating an example of acoustic spatial information according to an embodiment.

FIG. 7 is a diagram illustrating an example of acoustic spatial information according to an embodiment.

To perform rendering in real time based on an acoustic space, whether there is an obstacle between an audio object 700 and a listener 701 may need to be identified. For example, in order to determine whether there is an obstacle between the audio object 700 and the listener 701, whether a straight line connecting the audio object 700 to the listener 701 passes through triangles of a representative cuboid may be considered.

In order to determine whether there is an obstacle between the audio object 700 and the listener 701, it is necessary to determine whether a straight line connecting the audio object 700 to the listener 701 passes through all "12" triangles of the representative cuboid surrounding a mesh representing obstacles 702 and 703, which will be described in detail with reference to FIG. 8 below.

Figure 8:
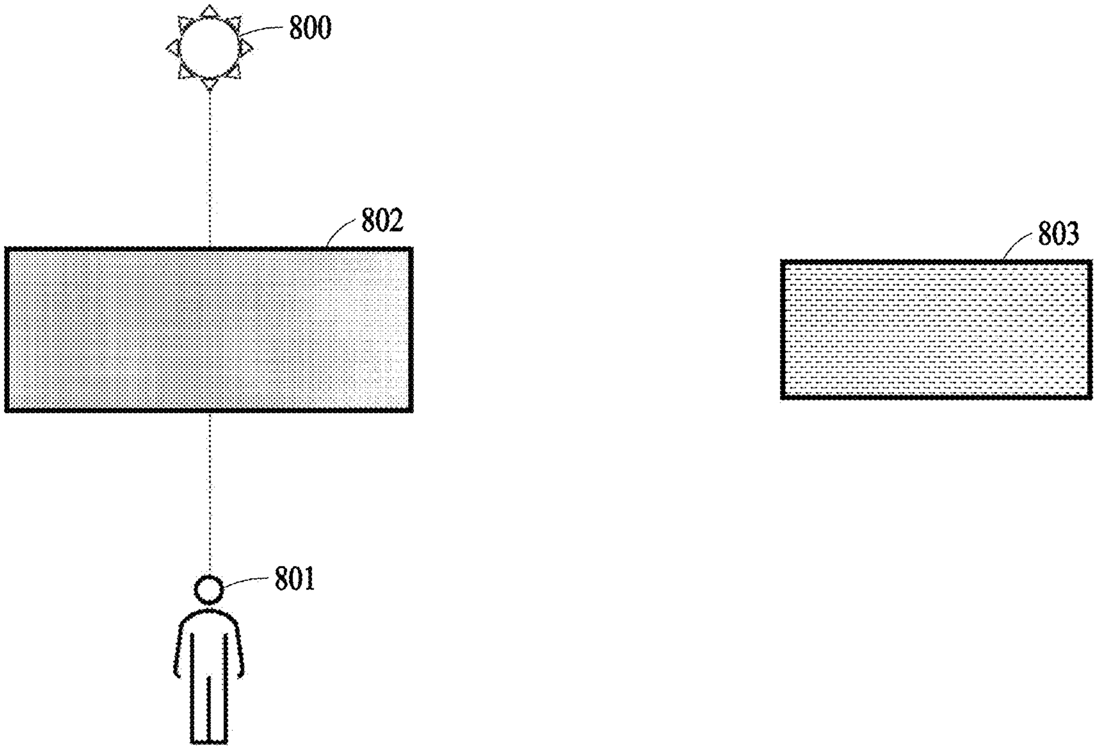
FIG. 8 is a diagram illustrating an example in which a mesh of acoustic spatial information is expressed as a representative cuboid according to an embodiment.

FIG. 8 is a diagram illustrating an example in which a mesh of acoustic spatial information is expressed as a representative cuboid according to an embodiment.

Referring to FIG. 8, a representative cuboid 802 corresponding to the obstacle 702 positioned in an acoustic space and a representative cuboid 803 corresponding to the obstacle 703 are shown. The obstacles 702 and 703 are represented by mesh 1 and mesh 2, respectively. In this case, it is assumed that the number of triangles constituting the representative cuboid 802 corresponding to the obstacle 702 is "12" and the number of triangles constituting the representative cuboid 803 corresponding to the obstacle 703 is "12" in total.

A procedure is conducted as follows in order to determine whether a straight line connecting an audio object 800 to a listener 801 passes through all the triangles constituting the representative cuboids 802 and 803.

Referring to FIG. 8, in the case of mesh 1, the straight line connecting the audio object 800 to the listener 801 passes, but in the case of mesh 2, the straight line connecting the audio object 800 to the listener 801 does not pass. Then, there is no need to determine whether the straight line passes through all the triangles included in mesh 2.

In this case, the number of times all triangles constituting the representative cuboids 802 and 803 pass through the straight line is determined to be 124 by adding the number of triangles constituting the representative cuboid of mesh 1, which is 12, the number of triangles constituting the representative cuboid of mesh 2, which is 12, and the number of faces constituting mesh 1, which is 100.

According to an embodiment, the amount of computations may be reduced by generating an impulse response using all the triangles included in the representative cuboid surrounding a mesh according to a mesh in acoustic spatial information.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The method and apparatus for processing acoustic spatial information according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous, in addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. A method of processing acoustic spatial information, the method comprising:

identifying at least one mesh disposed in an acoustic space;

setting a bounding box including all the vertices included in the mesh; and generating acoustic spatial information comprising information about the bounding box;

wherein the mesh represents a geometry that exists together with an audio object and a listener in the acoustic space; and wherein the bounding box is used to decode the geometry.

2. The method of claim 1, wherein the setting of the bounding box comprises setting the bounding box based on x_min that is a minimum value of an x-axis with respect to the bounding box, y_min that is a minimum value of a y-axis with respect to the bounding box, z_min that is a minimum value of a z-axis with respect to the bounding box, x_max that is a maximum value of the x-axis with respect to the bounding box, y-max that is a maximum value of the y-axis with respect to the bounding box, and z_max that is a maximum value of the z-axis with respect to the bounding box.

3. The method of claim 2, wherein the setting of the bounding box comprises:

determining eight vertices of the bounding box; and determining a plurality of triangles, using the eight vertices.

4. The method of claim 3, wherein the eight vertices are defined as:

vertex_01=(x_min, y_min, z_min);
vertex_02=(x_max, y_min, z_min);
vertex_03=(x_min, y_max, z_min);
vertex_04=(x_max, y_max, z_min);
vertex_05=(x_min, y_min, z_max);
vertex_06=(x_max, y_min, z_max);
vertex_07=(x_min, y_max, z_max); and
vertex_08=(x_max, y_max, z_max).

5. The method of claim 4, wherein the plurality of triangles is defined as:

Face_01=vertices (vertex_03, vertex_05, vertex_01);
Face_02=vertices (vertex_03, vertex_05, vertex_07);
Face_03=vertices (vertex_05, vertex_08, vertex_07);
Face_04=vertices (vertex_05, vertex_08, vertex_06);
Face_05=vertices (vertex_04, vertex_06, vertex_08);
Face_06=vertices (vertex_04, vertex_06, vertex_02);
Face_07=vertices (vertex_01, vertex_04, vertex_03);
Face_08=vertices (vertex_01, vertex_04, vertex_02);
Face_09=vertices (vertex_03, vertex_08, vertex_07);
Face_10=vertices (vertex_03, vertex_08, vertex_04);
Face_11=vertices (vertex_01, vertex_06, vertex_02); and
Face_12=vertices (vertex_01, vertex_06, vertex_05).

6. An apparatus for processing acoustic spatial information, the apparatus comprising:

a processor, wherein the processor is configured to identify at least one mesh disposed in an acoustic space, set a bounding box including all the vertices included in the mesh, and generate acoustic spatial information comprising information about the bounding box;

wherein the mesh represents a geometry that exists together with an audio object and a listener in the acoustic space; and wherein the bounding box is used to decode the geometry.

7. The apparatus of claim 6, wherein the processor is configured to set the bounding box based on x_min that is a minimum value of an x-axis with respect to the bounding box, y_min that is a minimum value of a y-axis with respect to the bounding box, z_min that is a minimum value of a z-axis with respect to the bounding box, x_max that is a maximum value of the x-axis with respect to the bounding box, y-max that is a maximum value of the y-axis with respect to the bounding box, and z_max that is a maximum value of the z-axis with respect to the bounding box.

8. The apparatus of claim 7, wherein the processor is configured to determine eight vertices of the bounding box and determine a plurality of triangles, using the eight vertices.

9. The apparatus of claim 8, wherein the eight vertices are defined as:

vertex_01=(x_min, y_min, z_min);
vertex_02=(x_max, y_min, z_min);
vertex_03=(x_min, y_max, z_min);
vertex_04=(x_max, y_max, z_min);
vertex_05=(x_min, y_min, z_max);
vertex_06=(x_max, y_min, z_max);
vertex_07=(x_min, y_max, z_max); and
vertex_08=(x_max, y_max, z_max).

10. The apparatus of claim 9, wherein the plurality of triangles is defined as:

Face_01=vertices (vertex_03, vertex_05, vertex_01);
Face_02=vertices (vertex_03, vertex_05, vertex_07);
Face_03=vertices (vertex_05, vertex_08, vertex_07);
Face_04=vertices (vertex_05, vertex_08, vertex_06);
Face_05=vertices (vertex_04, vertex_06, vertex_08);
Face_06=vertices (vertex_04, vertex_06, vertex_02);
Face_07=vertices (vertex_01, vertex_04, vertex_03);
Face_08=vertices (vertex_01, vertex_04, vertex_02);
Face_09=vertices (vertex_03, vertex_08, vertex_07);
Face_10=vertices (vertex_03, vertex_08, vertex_04);
Face_11=vertices (vertex_01, vertex_06, vertex_02); and
Face_12=vertices (vertex_01, vertex_06, vertex_05).

* * * * *